May 28, 1968  R. E. DUFOURNET  3,385,444
APPARATUS FOR TREATING SEWAGE
Filed June 6, 1966  4 Sheets-Sheet 1
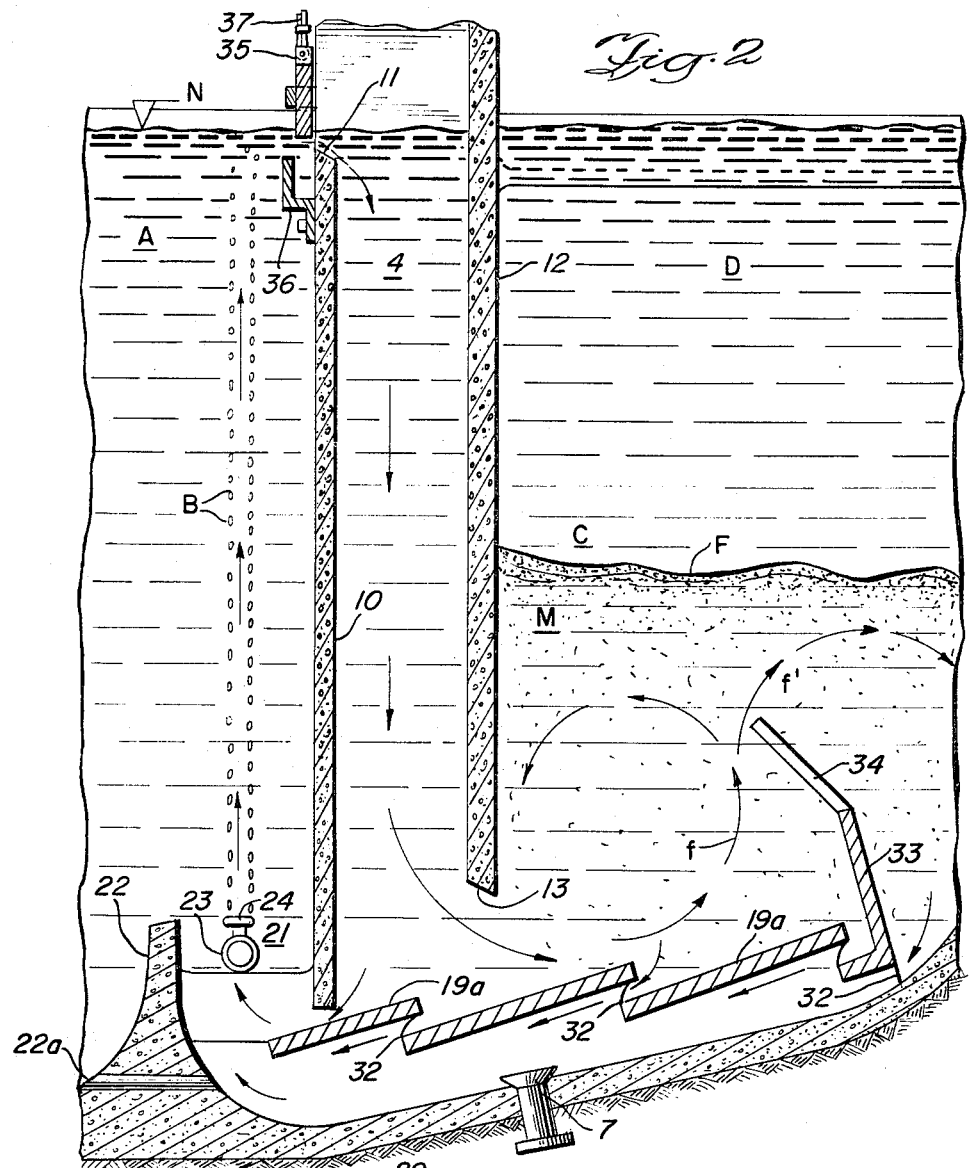
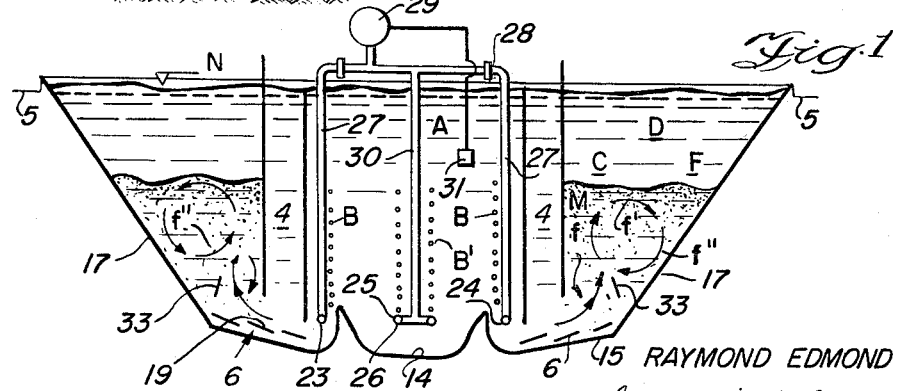
INVENTOR
RAYMOND EDMOND DUFOURNET
BY Dressler, Goldsmith, Clement & Gordon
ATTORNEYS

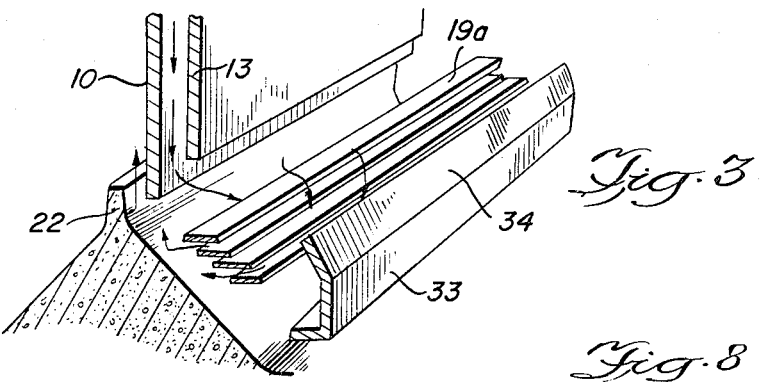
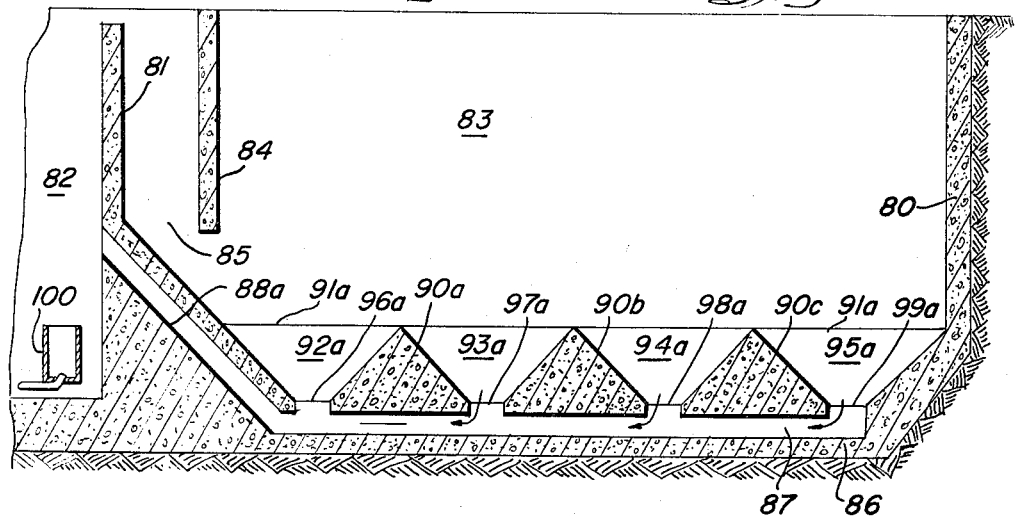
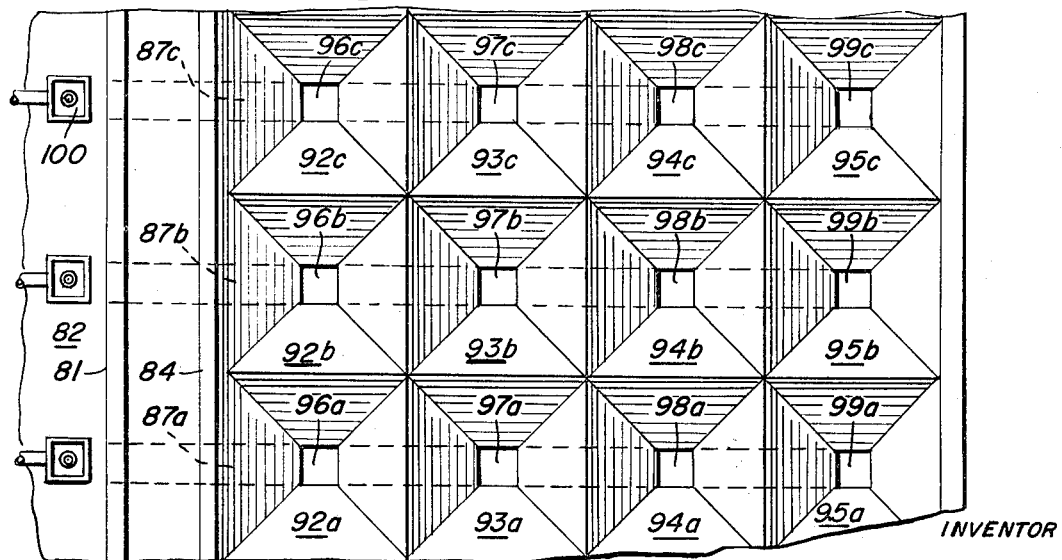

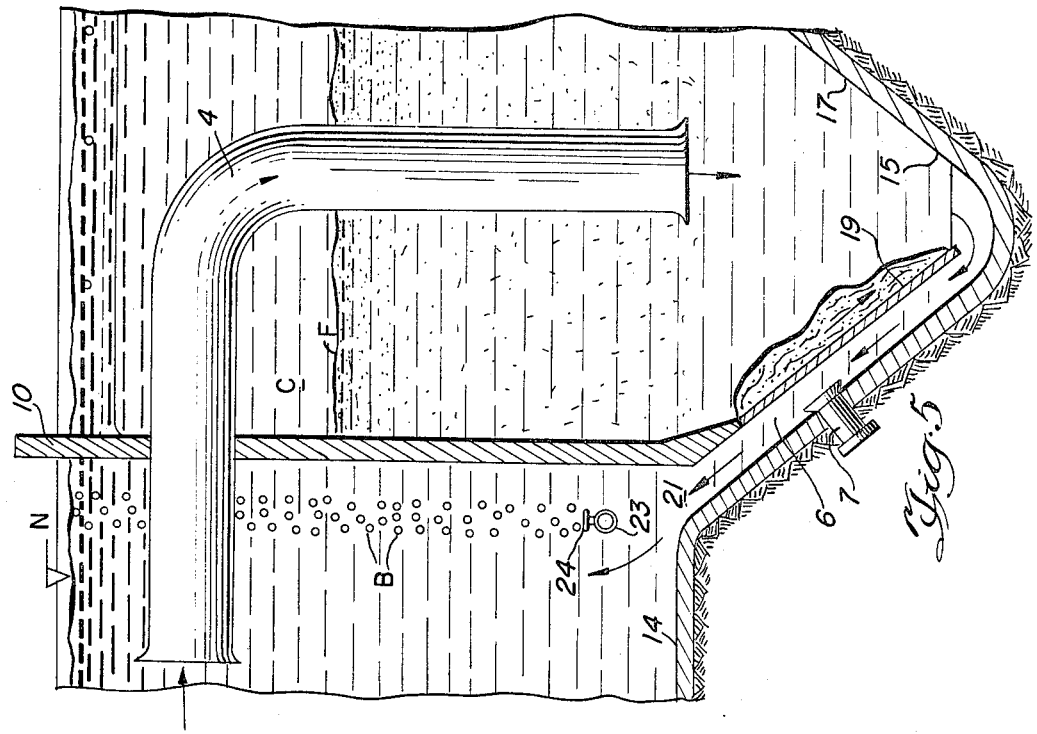
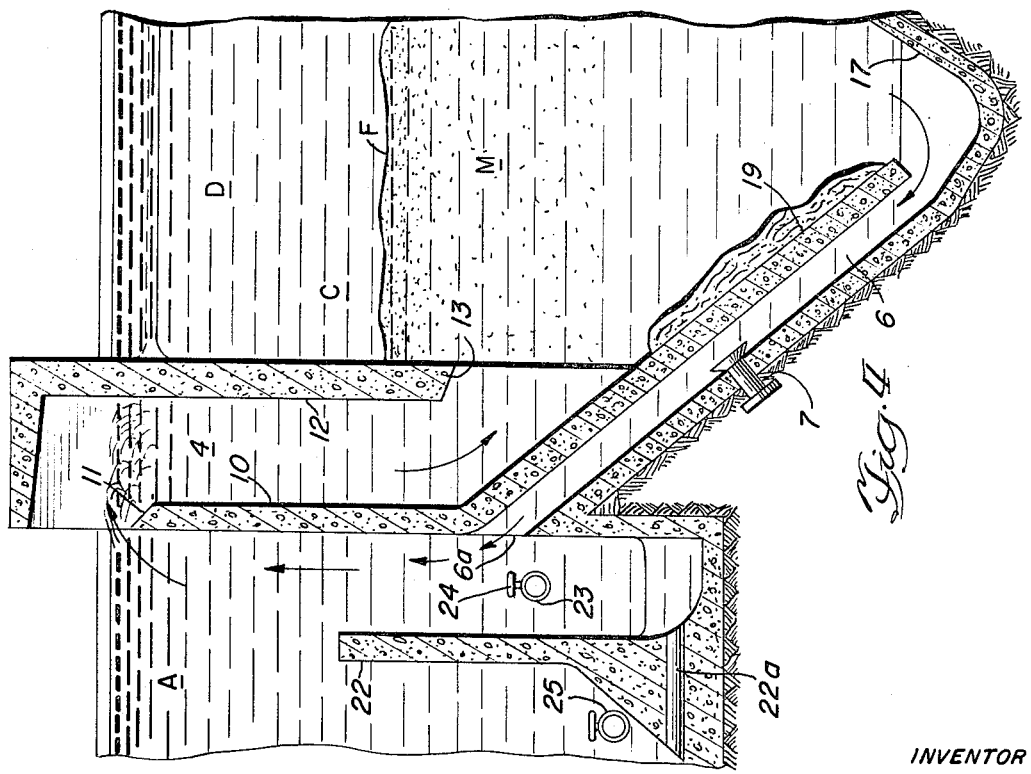

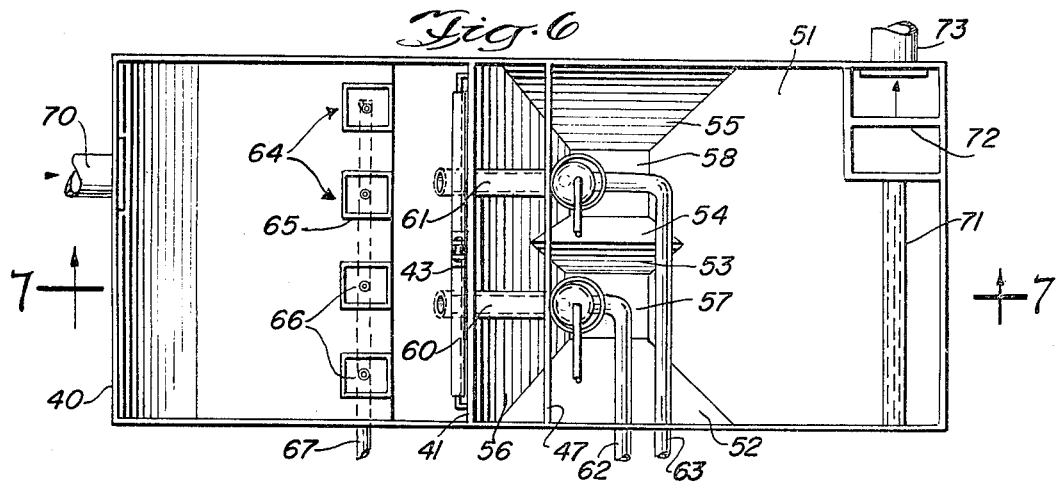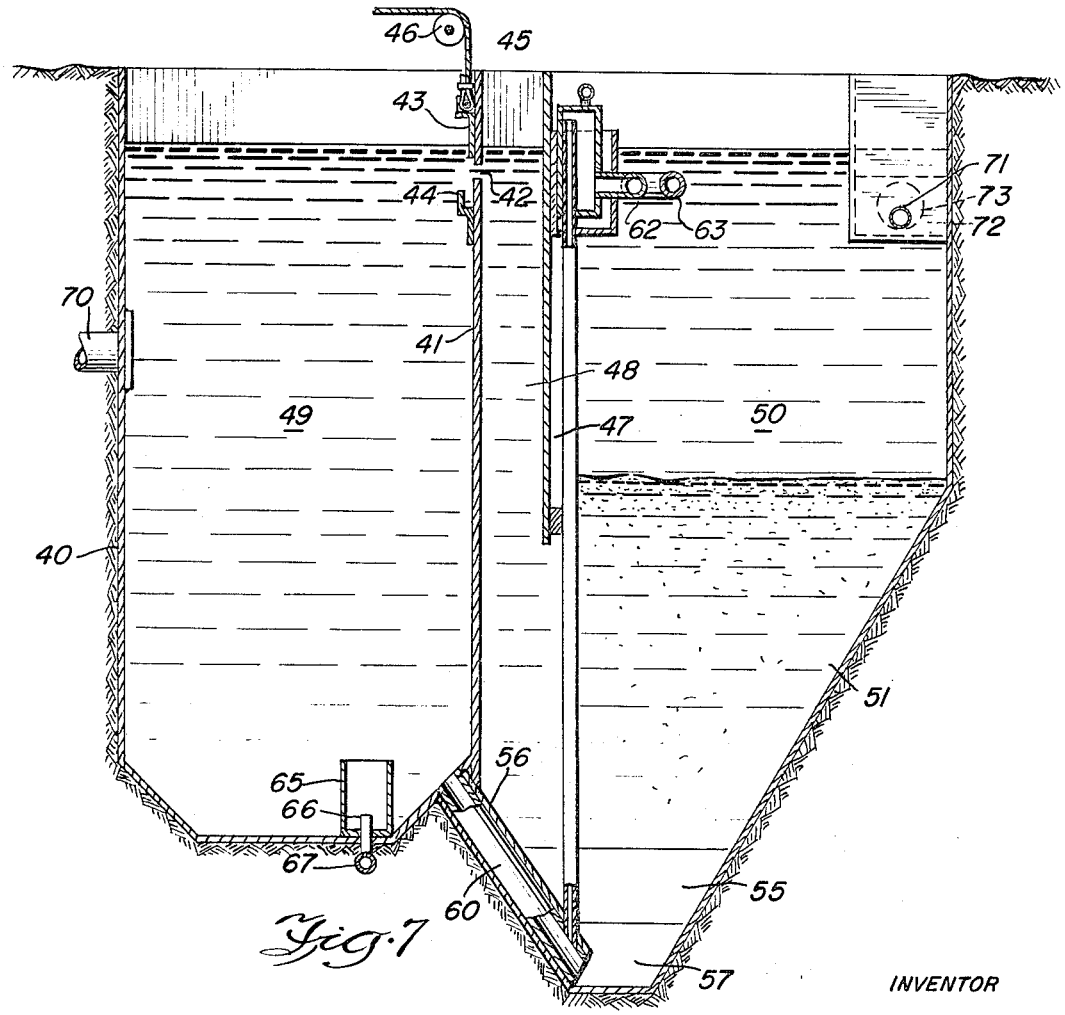

United States Patent Office

3,385,444
Patented May 28, 1968

3,385,444
APPARATUS FOR TREATING SEWAGE
Raymond Edmond Dufournet, 43 Rue La Bruyere,
Paris, France
Continuation-in-part of application Ser. No. 172,720, Feb.
12, 1962, which is a continuation-in-part of application
Ser. No. 105,737, Apr. 26, 1961. This application June
6, 1966, Ser. No. 555,579
Claims priority, application France, Apr. 28, 1960,
825,534
17 Claims. (Cl. 210—195)

This application is a continuation in-part of my United States application Ser. No. 172,720, filed Feb. 12, 1962, and entitled, Treatment Process and Apparatus, now abandoned, which application in turn was a continuation-in-part of United States application Ser. No. 105,737, filed Apr. 26, 1961, and entitled, Apparatus For Treatment of Water, now abandoned, said application Ser. No. 105,737, corresponding to French patent application Ser. No. 825,534, filed Apr. 28, 1960, a certified copy of which was filed in the United States Patent Office on June 1, 1961, in accordance with Rule 55(b) to serve as convention priority document.

This invention relates to a system for the gasification of liquid media. More particularly, it relates to a method and to apparatus for the treatment of water, more particularly but not exclusively to the treatment of aqueous sewage.

Briefly, the present invention comprises apparatus for treating aqueous media and a method of treatment wherein a gasified mixed liquor is introduced into a settling chamber at a rate of flow preferably capable of maintaining the volume of liquid and suspended solid material in the gasification chamber substantially constant, the volume of mixed liquid flowing to the settling zone being equal to the volume of the incoming feed plus the volume of a concentrated solids suspension recycled at a rate between 100% and 500% of the volume of the incoming feed. The gasified mixture is introduced into the settling chamber at a flow rate permitting introduction into the settling chamber or tank area where solids settling conditions are maintained, without disrupting the settling of solids. In the settling chamber the mixture separates into a clarified liquid portion and a solids concentrate portion, the clarified liquid portion being discharged from the system. Part of the solids concentrate portion of the mixture is automatically returned as a solids suspension through a passage or passages providing direct communication between the area of the settling chamber where solids accumulate or concentrate and the zone of gasification of mixture containing incoming feed. Part of the solids concentrate portion of the gasified mixture is wasted continuously or periodically to maintain the total solids in the system substantially constant.

The liquid treatment of this invention is a type having utility in an activated sludge type of process for treating sewage, in the treatment of industrial wastes, in various fermentation processes, and the like.

It has been conventional in installations for the treatment of, for example, sewage, to have the treatment tanks separated and to pump sludge removed from the settling tank back to the aeration tank to form a mixed or seeded liquor. Installations also exist in which the aeration stage and decantation or settling stage are interleaved to take advantage of simplified, inexpensive construction and to have apparatus operated with a minimum loss of hydraulic head. One of the latter types of operation utilized in an unsuccessful commercial installation involved a single large tank segmented to provide a centrally located chamber with hoppered bottom flanked by aeration chambers. In this apparatus, mixed liquor flowed from the aeration chamber to the settling chamber between offset walls and the concentrated sludge passed downwardly from the hoppered settling chamber through wall openings in or adjacent the bottom of the hopper into the general vicinity of a gas dispersion unit positioned adjacent the bottom of an aeration segment of the tank. This apparatus and type of operation was abandoned because of operating difficulties such as clogging, low BOD removal due to lack of control over the volume of liquid circulating between the tank segments and the quantity of the sludge recycled from the settling chamber to the aeration chamber.

Now it has been discovered that an aeration tank and a settling tank can be joined into a cooperating combination capable of providing high BOD removal, having direct flow connections for flow of liquid medium from the aeration tank to the settling tank and for flow of concentrated sludge suspension from the settling tank to the aeration tank. The liquid flows are induced by differences in hydraulic head between the tank segments and are controlled in this system so that the flow of liquid into the settling tank is maintained in a volume in excess of the volume of clarified liquid being discharged from the settling tank, with the liquid containing concentrated solids remaining after discharge of effluent, being returned to the gasification chamber under conditions maintaining solids in suspension.

In accordance with the present invention, as applied to the treatment of sewage, an aqueous sewage containing suspended solids is introduced into an aeration zone where the incoming sewage is mixed with previously gasified material to form a mixed liquor. Treated mixed liquor, i.e., treated liquid and suspended solids, are continuously removed from the aeration zone and introduced into a quiescent or settling zone below the level of settling solids being concentrated therein and clarified liquor separated in the settling zone is continuously overflowed from the settling zone. Solids concentrated in the settling zone are removed therefrom, a portion thereof being returned to the gasification zone and a portion thereof being wasted to avoid excessive concentration of solids in the system. The liquid volume of material wasted plus the volume of clarified liquor discharged from the settling chamber is maintained substantially equal to the volume of incoming sewage. In addition to maintaining continuous flow of mixed liquor from the gasification chamber to the settling chamber, a continuous recycle, i.e., a continuous flow of liquid plus concentrated solids is maintained in a second flow communication passage linking the portion of the settling zone utilized for accumulation of concentrated solids with the gasification zone. Liquid movement from the settling chamber to the gasification chamber through this direct communication link is induced by hydraulic head in the gasification chamber and/or by introduction of at least a portion of the gaseous medium utilized for the gasification operation adjacent to the outlet of said communication link. Movement of mixed liquor between the gasification zone and the settling zone is regulated so that the volume of liquor flowing from the gasification zone to the settling zone is in such excess over the volume of clarified effluent discharged from the settling zone that concentrated solids are suspended for recycle in a volume of liquid which is greater than the volume of the incoming sewage. This concentrated sludge suspension is returned to the gasification zone under conditions of turbulent flow in said second communication link.

The apparatus, in a form particularly adapted to carry out the method of this invention, is a combination consisting of an aeration tank and a decanting tank, preferably mounted in laterally adjacent positions in order to minimize construction costs, adapted for liquid to flow successively through the aeration tank and the decantation tank and having a single passage or a multiplicity of passages connecting the zone of accumulation of settling solids of the decanting tank with the interior of the aeration tank, said zone of accumulation of settling solids having the boundaries thereof arranged so as to direct concentrated solids into said passage and the cross-sectional area of said passage or the total area of the passages being such that the average velocity of liquid being recycled through the passage or passages to the aeration tank is sufficient to maintain the solids in suspension during said transfer back to the aeration tank.

In one embodiment of the apparatus for carrying out the process of this invention, the combination comprises adjacent aeration and settling tanks with liquid flow means providing communication between the liquid-holding upper portion of the aeration tank and the lower portion of the settling tank. Communication for the purpose of recycling a solids concentrate from the vicinity of the bottom of the settling tank to the aeration tank is provided by liquid flow means comprising a laterally closed passageway or chimney. This passageway which is generally straight, is upwardly directed so that the longitudinal axis of the passageway which passes through the lowermost portion of said settling tank will be positioned angularly relative to a vertical plane extending longitudinally of said settling chamber, i.e., an angularity intermediate the horizontal and vertical positions, preferably at an angle in the range between about 45 degrees and 80 degrees to the horizontal.

The upwardly directed flow passage means for recycling sludge may consist of a single passageway with one or more inlets in the settling tank and one or more outlets in the aeration tank or the means may consist of a multiplicity of adjacent or spaced passageways each having one or more inlets and one or more outlets.

This upwardly directed flow passage means generally is formed or positioned along a wall extending upwardly from the lowermost portion of the settling chamber with the passage means having the inlet at its lower end positioned adjacent the lowermost portion of the settling chamber in spaced relationship thereto and having the upper end of the passage terminating at an outlet adjacent the upper edge of the upwardly directed wall with the outlet being at a point below the normal liquid level in the gasification chamber.

The settling chamber of this combination is provided, in the solids concentration portion thereof with sloping surfaces adapted to direct the accumulating sludge concentrate towards the sludge recycle liquid flow means inlet or inlets. In one preferred embodiment of the apparatus, the sludge recycle passageway is provided with a thin roof portion extending a substantial distance within the settling tank, i.e., to form a false bottom, with the surface of the roof being sloped so that sludge accumulating on or adjacent said roof, can move along the sloping surface of the roof to a point where the sludge moves into and is entrained in the balance of the sludge moving into an inlet to the sludge recycle passageway.

Several features of the apparatus combine to maintain a high rate of return to the aerator of sludges collected in the decanting chamber in order to protect the metabolism of the sludges and to reduce the consumption of oxygen. One of the features resides in the particular arrangement of sludge recycling conduit permitting the direct return to the aerator of sludges accumulating in the decanter or settling tank. It has been found that the sludges passing through the recycling conduit arranged as taught in accordance with this invention, have a uniform concentration and have relatively constant properties. By virtue of samples extracted from the sludge in the return passage, it is possible to maintain a close check on the solids concentration and the quantity of sludge and in consequence thereof to regulate the flow at will with a view to maintaining optimum conditions, account being taken of the whole of the hydraulic arrangements of the system.

Another feature is the simplified control and regulation which make it possible in the instant apparatus to obtain and to maintain operating balances characterized by very short periods of time in the aerator, very high rates of destruction of the biochemical demand for oxygen per cubic meter of aeration chamber volume, together with greatly reduced costs.

In the operation of the apparatus in accordance with the instant invention, liquid media, for example, aqueous sewage is introduced into a tank having one or more air dispersers positioned therein. In the tank, the aqueous sewage is mixed with recycled concentrated sludge. This recycling of concentrated sludge through the upwardly directed passage forming a communication link between the bottom of the settling tank and the lower portion of the aeration tank, may be induced solely by hydraulic head created in the aeration tank. Introduction of air into the mixed liquor in the aeration tank creates a liquid of lower density and circulates such a liquid past the outlet from the passage. Movement of this aerated liquid past the outlet is sufficient to induce circulation through the passage and to make flow automatic when the hydraulic head on the aeration tank exceeds the hydraulic head requirements for flow of the volume of liquid constituted by influent flow volume and recycle liquid volume from the upper portion of the aeration chamber into the settling chamber.

In addition to these pumping and air-injecting devices, auxiliary injectors may be provided having an output variable in accordance with the biological oxygen demand of the aqueous media. The various bubble-emission devices are preferably supplied from a source of air with a variable rate of flow, and devices for limiting the flow are interposed between this source and the gas injectors. The auxiliary bubble injectors are preferably arranged in any so-called neutral zone of the aeration chamber in which the bubbles emitted do not have any substantial influence on the recycle circulation, so that this latter preserves its constant properties independent of the rate of injection of air. Mixed liquor after treatment in the aeration zone, passes to the settling tank through any of a number of suitable flow means, such as by overflowing a weir adapted for liquid level control, by a submerged orifice, by provision of spaced walls providing a liquid passage, one of said spaced walls also being adapted for adjustment of liquid level, and the like. While reference is made here to means for controlling the flow of mixed liquor, the regulation of the interchange of liquid between the aeration and settling tanks necessary to the successful operation of the instant process may be exercised at any one or more of several points, the means for moving mixed liquor from the aeration tank to the settling tank providing but one of the areas where control may be exercised.

Treated mixed liquor introduced into the decanting or settling chamber carries solid material which must be rapidly concentrated and settled. This settling is accomplished in the instant apparatus by introducing the mixed liquor into the lower half and preferably the low one-third of the settling chamber at flow rates having a minimum agitation effect.

Mixed liquor introduced into the settling chamber at flow rates of from 0.5 to 6 feet per minute have been found to cause little disturbance of the sludge blanket formed in the settling chamber and the sludge concentrating in the lowermost region of the settling tank.

The concentrated sludge is recycled to the aeration tank through conduits adapted to receive a sludge of reasonably uniform concentration. The continuous direction of sludge to the recirculation coduit or passage is accomplished by any of a number of arrangements of settling tank walls and baffles. If the inlet of the passage for recirculation of sludge is at the low point of the settling chamber, the walls of the settling chamber may be set with an inclination of the order of 50° or more to the horizontal and the movement of sludge will take place by simple gravity. If the conduit or passage is formed with an upward slope within the settling tank, a false bottom may be used to separate the passage from the main settling portion of the settling tank and the movement of sludges will be facilitated by slots in the false bottom directed transversely to the direction of liquid flow in the passage. Alternatively, if liquid flow in the bottom of the settling chamber naturally tends to move sludge upwardly on the wall of the settling tank opposite to the inlet to the passage, the movement of sludge may be prevented by the use of suitable baffling means placed adjacent to but spaced from said wall.

Rapidly accumulated sludge is moved to the aeration tank through one or more conduits or passages. The passages may or may not be adapted with flow control means. Generally, if it has been established that adequate flow control is maintained at another point, then the passages may be simple, unobstructed conduit members. If no control has been provided elsewhere then the flow is controlled by suitable means such as a damper door or equivalent means operating at the inlet or outlet end of each recycle passage.

In the recycle passages, it is necessary to maintain turbulent flow conditions in order to prevent accumulation of solids which could result in clogging. Generally, a rate of flow excess of about 15 feet per minute, usually between about 15 feet per minute and 60 feet per minute, will maintain flow conditions sufficient to maintain flocculent solids suspended in the flowing medium. It is usually preferred to maintain a rate of flow in the recycle passage in the range between 35 feet and 50 feet per minute.

A requirement for operability of the instant process is that the internal liquid flow of the system at all times be controlled so that a recycle stream having a volume between about 100% and 500% of the volume of the aqueous medium being introduced into the treating system, is continuously moving between the settling zone and the aeration tank. This recycle stream will vary in solids content depending upon the quantity of solids in the incoming feed, the volume of the recycle, the solids concentration it is desired to approximate in the liquid under aeration and manner and quantity of solids being wasted, i.e., removed from the system. Generally, it is desirable to maintain between about 1000 parts per million and 6000 parts per million of solids in the liquid under aeration.

The capabilities and advantages of the invention will be apparent to those skilled in the art from the following description of preferred embodiments thereof, taken in conjunction with the accompanying drawings in which:

FIGURE 1 is a diagrammatic view in cross section of an aeration and settling tank combination for the purification of aqueous sewage in accordance with the present invention;

FIG. 2 is an enlarged view, in section, of a portion of that unit;

FIG. 3 is a perspective view of the bottom portion of the unit shown in section in FIG. 2;

FIG. 4 is a view in cross section of an alternative construction showing the return passage for recycle sludge having its outlet positioned adjacent to and above an air dispersing element;

FIG. 5 is a cross-sectional view of a second alternative form of construction wherein a submerged conduit provides means for introduction of treated aerated mixed liquor into the settling chamber and the passage for recycle sludge has its outlet positioned in the floor of said aeration tank below an air dispersing element;

FIG. 6 is a top plan view of a unitary tank undivided into an aeration portion and a settling portion having the flow controlled by a vertically movable plate;

FIG. 7 is a sectional view of the assembly along the line 7—7 of FIG. 6;

FIG. 8 is a view in section similar to the view shown in FIG. 2 illustrating an alternative arrangement for the bottom portion of the settling chamber; and FIG. 9 is a top plan view of the apparatus shown in FIG. 8.

Referring to the FIGURES 1, 2 and 3 in which is shown an aeration and decantation working unit in accordance with this invention, the unit is, for example, of the rectilinear type, FIG. 1 being a transverse section in which can be seen decanting chambers D positioned on each side of an aeration chamber A. The working unit may, however, be of the circular type, FIG. 1 then being representative of a diametral section in which the chamber D surrounds the chamber A in concentric manner.

In FIGURES 1, 2 and 3 the chamber A and the chamber D are separated from each other by two partitions, a rising partition or wall 10, the top 11 of which is arranged a little below the level N of the wall in the chambers A and D and a descending partition 12, the lower extremity 13 of which is located above the bottom of the chambers. The two partitions 10 and 12 form a baffle passage 4 in which the water can pass downwardly so as to flow from the chamber A to the chamber D. In the example of FIGURES 1 and 2, the bottom 14 of the chamber A is flat and horizontal, whereas the bottom 15 of the chamber D is slightly rising initially and then rises more sharply at 17.

The slope 19 constitutes the upper wall of a long and narrow recycling passage 6 which couples the chamber D to the chamber A and more specifically to a zone 21 of the chamber A. The zone 21 is located slightly above the level of the bottom 14 and is adjacent to the partition 10. It is separated from the bottom portion of a chamber A by a small wall 22. Communicating passage 22A can be provided with advantage in the wall 22.

The upper wall 19 of the passage 6 directs concentrated sludge into the passage 6 by suction through the openings 32 formed in the wall 19, the latter being shaped for that purpose in rising steps 19A. The passage 6 mixes liquor and concentrated sludge to a uniform solids concentration medium and according to the invention there are provided at 7 means for extracting samples of these sludges by continuous or intermittent means, for example, by airlift, etc. The samples of sludges removed from the passage 6 may be analyzed by any appropriate apparatus, for example, pictometers or the like. By comparison of the sludges removed from the passage 6 and conduit 4, it is possible to obtain an exact and rapid measurement of the rate of recycling flow. Such a rapid measurement is essential in order to regulate the operation of the installation without incident. By way of example, an insufficient flow of recycling material can cause deterioration of the sludges in about 20 minutes. The exact measurement of the rate of recycling flow thus enables the working of the flow regulating mechanism to maintain optimum operating conditions.

In addition, a deflector 33 is arranged in the chamber D and may be formed by a plate mounted in the vicinity of the bottom 19 and directed upwards and towards the chamber A. The plate 33 is of relatively small height, and extends completely below the interface F of separation between the clear water C and the sludge M in the chamber D. At its upper portion, it is provided with a row of arms 34 arranged like a harrow. The plate 33 has the effect of inducing a very slow swirling movement of the water coming from the descending conduit 4. This movement is only communicated to the deeper portion of the chamber D formed between the walls 19, 33 and 12, and is shown diagrammatically by the arrow $f$ in FIGS. 1 and 2. The movement $f$ entrains in its turn the contiguous layers of water in the chamber D in a whirling motion, also very slow, in the direction of the arrow $f'$. The movement $f'$ has the particular feature of following the bottom 17 of the chamber D in a downward direction (see arrow $f''$ in FIG. 1) which assists the separation of the sludge from the clear layer C and its movement towards the recycling passage 6.

A horizontal conduit 23 supplied with air under pressure and having outlets 24 for the emission of air bubbles B is arranged in the zone 21. The bubbles are intended on the one hand to induce the movement of the water over the following circuit; upward movement in the chamber A in the vicinity of the partition 10, downward movement in the baffle passage 4 and then into the chamber D and through the passage 6, and on the other hand they permit of a treatment with air of the water in the chamber A which is favorable to the development of the aerobic microbes. In other words, the emitters 24 of the bubbles B have the double function of pumping and biochemical treatment of the water.

In addition to the air injectors 24, other outlets 25 are provided in conduits of compressed air 26 arranged at the bottom of the chamber A (see FIG. 1). These outlets 25 discharge air bubbles B′ intended to complete in an appropriate manner the treatment with air of the water in the chamber A. In other words, the emitters 25 of bubbles B′ have the primary function of biochemical treatment of the water, additional to the treatment carried out by the bubbles B.

The conduits 23 have the particular feature of being supplied with compressed air at a predetermined and constant rate of flow chosen in such manner that the circulation of the water recycled through baffle passage 4 and passage 6 is sufficient to prevent clogging of sludge in the passage 6, but is insufficient to cause a general agitation of the chamber D. On the other hand, excessive agitation of the chamber D is also most undesirable, since it gives rise to turbulence along the interface F which separates the upper layer C of clear water in the chamber D from the sludgy lower water M, such turbulence being liable to interfere with the correct operation of the installation, the essential object of which is precisely that the water passing out at 5 from the chamber D should be substantially free of sludge.

The arrangement according to the invention of a continuous supply with an exactly-dosed constant rate of flow from the outlets 24 enables a correct operation to be maintained in a stable manner free from the two risks indicated above. Such a form of supply comprises, in the example shown in FIGURE 1, conduits 27 coupled to the conduits 23 and each provided with a flow-limiting apparatus 28 of any appropriate type. The conduits 27 lead from an air compressor 29 which additionally feeds air over the conduits 30 to the conduits 26 provided with outlets 25 for bubbles B′ but without the interposition of any flow-limiting apparatus.

The compressor 29 has a variable output which can be varied as a function of the requirements of air for the chamber A: a large output when the water is highly charged and a small output when the water charge is low. The control of the output of the compressor 29 may be automatic and for example, may be controlled by a device 31 immersed in the chamber A and responsive to the sludge content of this chamber. However this may be, the output of the bubbles B injected at 24 is maintained constant by the flow limiters 28 and it is the supplementary flow provided by the bubbles B′ which varies when the control of the compressor 29 causes a change of the output delivered by this latter. The supplementary output at B′ may thus vary from a very low value to very large values.

Depending on the position of the outlets 25 of the bubbles B′, the latter may have a more or less great influence on the circulation of water through baffle 4 and passage 6 induced and maintained by the contsant rate of flow of the bubbles. Thus, if the outlets 25 are close to the outlets 24, the bubbles B′ add their action to that of the bubble B in causing the water to circulate through baffle passage 4 and passage 6. If the outlets 25 are farther away from the outlets 24, the bubbles B′ have on the other hand the reverse action of those of the bubbles B.

Between these two cases, experience has shown that there exists a favored zone, known as the "neutral zone" for the outlets 25, such that the bubbles B′ emitted have no action either in one sense or the other on the circulation of water through baffle 4 and passage 6. According to the invention, it is in this neutral zone that the outlets 25 are arranged. By virtue of this arrangement, the additional output of the bubbles B′ may be of any value, very low or very great, without causing any disturbance in the circulation through baffle passage 4 and passage 6 so that the recycling always remains identically the same, under the best conditions of operation and without any risk of disorder.

The dispersers 24 are placed higher than the emitters 25 so as to take account of the losses of pressure in passage of gas through the flow limiters 28.

The dispersers 24 and 25 can be shaped in any appropriate manner. According to one arrangement, the constant flow dispersers may be, for example, of the bubble type operating on the principle of hydraulic shear for bubble size reduction, which have the advantage of freedom from any risk of becoming clogged.

In operation, the waters to be purified are admitted to the chamber A, in which they receive a treatment by air with the bubbles B and B′. A circulation of aqueous solids suspension is established through baffle passage 4 and passage 6 and causes a partial recycling of the sludge. In the chamber D, the water decants and divides into the clear upper layer C from which is taken the water delivered at 5, and the lower sludgy layer M, those two layers being separated by the interface F which is maintained stable by virtue of the means previously described. As will be understood, the thickest sludge falls to the bottom of the chamber D. Any accumulations of sludge cannot persist by reason of the orifice 32 of the wall 19, which constitutes a platform directing the sludge into the passage 6, from which the circulation of recycling water brings them into the chamber A. Furthermore, the excess of sludge is withdrawn from the chamber D to be conducted, for example, to a digester.

In the apparatus shown in FIG. 2, flow regulating means consisting of an adjustable plate 35 slidable in a guide 36, is positioned adjacent the top of the partition wall 10. Adjustable plate 35 has secured thereto suitable elevating means 37 such as a wire cable adapted for vertical movement by suitable hoisting means (not shown) such as a winch.

Referring now to FIG. 4, there is shown an arrangement which is similar to that shown in FIGS. 1 and 2. In this apparatus, the passage 6, instead of opening beneath the diffusers 24, has its outlet in this case at 6a above the said diffusers 24. The positioning of the diffusers 24 below the path of the material flowing from the passage 6, as shown in FIGURE 4, has the advantage of keeping the diffusers from being fouled or clogged by debris flowing through the passage 6. In addition, the passage 6 rises from the chamber D towards the chamber A, the sludges being admitted to the intake of the passage 6 by sliding by gravity along the wall 19. The small wall 22 is preferably extended to a height above that of the outlet 6a, without however preventing the sludge reintroduced at 6a into the chamber A from reaching all the various parts of this chamber, so that this sludge can accelerate, with the optimum efficiency, the conversion by air of the freshly-arrived sludge. Alternatively, it is also possible to arrange at the outlet flow directing means in the vicinity of the various diffusers 24 of bubbles B, so that the sludge passing out at 6a is not immediately acted on by the bubbles B, but is directed towards the central portions of the chamber A. A communication 22a may also be provided between the chamber A and the space located immediately below the emitters 24, with a view to the action by the bubbles B on the sludges coming from the chamber A rather than on those coming from the chamber D.

In a further alternative form shown in FIG. 5, the arrangement is again similar to that of FIGS. 1 and 2 and of FIG. 4, but in this case the small wall 22 is eliminated while the passage from the chamber A to the chamber D consists of one or an umber of conduits 4, the small wall 10 being extended above the level N of the water.

Referring to FIGS. 6 and 7, the numeral 40 indicates a tank. Tank 40 is provided with a partition wall 41 provided with a horizontal slot 42 below the normal liquid level of the tank. A liquid flow regulating mechanism consisting of an adjustable plate 43, slidable in a guide 44, is positioned adjacent the slot 42. Adjustable plate 43 has secured thereto suitable elevating means 45 such as a wire cable adapted for vertical movement by suitable hoisting means 46 such as a winch.

Laterally spaced from partition wall 41 is a depending partition 47, the lower extremity of which is located above the bottom of the chamber. The two partitions 41 and 47 form a baffle passage 48 in which liquid medium passes downwardly so as to flow from the chamber 49 to the chamber 50.

The chamber 50 is provided at the bottom with sloping walls 51, 52, 53, 54, and 55. Sloping walls 51, 52, and 53 cooperate with sloping extension 56 of partition wall 41 to provide an accumulation sump 57 for settling solids. Sloping walls 51, 54, and 55 cooperate with sloping extension 56 of partition wall 41 to provide a second accumulation sump 58.

Sumps 57 and 58 are provided with upwardly extending unobstructed conduits 60 and 61 respectively, i.e., recycle passages for accumulated solids. Sumps 57 and 58 are also provided with pipes 62 and 63, respectively, for withdrawing solids concentrates for disposal. The outlet of the conduits or passages 60 and 61 is located adjacent below gas dispersing means 64 in aeration chamber 49.

Gas dispersing means 64, as illustrated, comprises a series of square containers 65 closed on the sides and open at the top. Containers 65 are of a height exceeding the longest horizontal axis of the container. Gas is introduced into containers 65 adjacent the bottom thereof through open pipes 66 communicating with header 67 which header is adapted to receive air under pressure from a source not shown.

The apparatus, for example as described with reference to FIGS. 6 and 7 may be used in the treatment of sewage. Raw or settled sewage enters the chamber 49 through a sewage conduit 70. Recycle activated sludge concentrate accumulated in chamber 50 enters the chamber 49 through passages 60 and 61. Clarified liquor is discharged from chamber 50 through drawoff pipe 71, oveflow weir 72 and outlet pipe 73.

The apparatus shown in FIGURES 8 and 9 depicts an alternative arrangement for the bottom of the settling tank. In this apparatus, the numeral 80 indicates a tank with a partition wall 81, separating the aeration chamber 82 from the settling chamber 83. Laterally spaced from partition wall 81 is a depending partition 84, the lower extremity of which is located above the bottom of the chamber. The partitions 81 and 84 form a baffle passage 85 for the transfer of liquid medium from the chamber 82 to chamber 83.

The chamber 83 is provided at the bottom with a floor 86. Floor 86 is adapted with a conduit 87a therein which is positioned transversely to the longitudinal axis of chamber 83. Conduit 87a is provided with an upwardly directed sloping portion 88a which has the outlet thereof positioned in the chamber 82 adjacent means 100 for introduction of gas. Chamber 83 may be provided with one or more transversely positioned conduits depending upon such factors as the longitudinal length of the chamber, the volume of sludge to be recycled, etc.

In the particular apparatus shown the bottom of chamber 83 is provided with a plurality of projections 90a, 90b, and 90c extending the longitudinal length of the chamber which appear as triangular members in section, and projections 91a and 91b positioned transversely to projections 90a, 90b, and 90c and intersecting therewith so as to produce inverted truncated pyramidal hoppers 92a, 92b, and 92c, 93a, 93b, and 93c, 94a, 94b, and 94c, and 95a, 95b, and 95c. Each of the hoppers 92a, 93a, 94a, and 95a are provided with apertures 96a, 97a, 98a, and 99a, respectively, for passage of accumulated sludge into the conduit 87. In FIGURE 9, parallel conduits are indicated as conduits 87a, 87b, and 87c. Hoppers 92b, 93b, 94b, and 95b are each provided with apertures 96b, 97b, 98b, and 99b, respectively, for passage of accumulated sludge into the conduit 87b. Hoppers 92c, 93c, 94c, and 95c are each provided with apertures 96c, 97c, 98c, and 99c, respectively, for passage of accumulated sludge into the conduit 87c.

It will be recognized that one or the other projections, i.e., projections of the type illustrated as 90a or the type illustrated as 91a, i.e., either the longitudinally directed or transversely directed projections, can be eliminated without effecting too drastic a change in the mode of operation of the settling chamber 83.

In the treatment of sewage, raw sewage as it reaches a treatment plant contains floating and suspending material. In a modern sewage disposal plant, the sewage may flow through a grit chamber and a comminutor and then through a primary settling tank. Primary effluent or raw sewage is introduced into the chamber 49 and is combined with recycled activated sludge to form a mixed liquor. Solids content of the mixture may vary considerably but generally is held to within the range between about 1,000 and 6,000 p.p.m. Air supplied to the chamber 49 from positive displacement or centrifugal blowers is delivered to the multiplicity of gas dispersal units in quantities sufficient to maintain circulation or to satisfy the BOD, whichever is greater. When raw sewage is fed to the apparatus such as is disclosed in FIGS. 6 and 7, at a rate of approximately 10 gallons per minute of sewage containing 200 p.p.m. of solids, the flow regulating plate 43 is positioned so as to pass, for example, 40 gallons of treated mixed liquor per minute. The spacing of partition walls 41 and 47 is such that the mixed liquor flowing from tank 49 to tank 50 has a rate no greater than approximately one foot per minute. Approximately 10 gallons per minute of clarified liquor is discharged from the chamber 50. Approximately 30 gallons per minute of concentrated sludge is delivered through the passages 60 and 61 to the chamber 49. In apparatus designed to handle a feed of 10 gallons per minute of raw sewage, the passages 60 and 61 have dimensions such that the flow through each passage is turbulent and will transport the concentrated solids from chamber 50 to chamber 49. Operating as described, a 90% removal of BOD may be effected.

Although the invention has been described in connection with specific embodiments, it will be understood that these are not to be regarded as limitations upon the scope of the invention except insofar as included in the accompanying claims.

I claim:

1. Apparatus for the treatment of an aqueous medium which comprises adjacent gasification and settling chambers, each defined by a bottom and a plurality of sidewalls, said chambers being separated by a wall member, at least a portion of which forms a substantially vertical divider between said chambers and said settling chamber and having a wall extending upwardly from the lowermost portion of said settling chamber to a juncture with one of said sidewalls of said gasification chamber, upwardly directed flow passage means associated with said upwardly extending wall of said settling chamber having an inlet positioned adjacent the lowermost portion of said settling chamber in spaced relationship thereto and an outlet at the gasification chamber side of and adjacent the bottom end of the substantially vertical portion of said divider between said chambers, said outlet being at a level of intermediate depth in the liquid normally maintained in said gasification chamber, said upwardly extending wall of said settling chamber being positioned so that the longitudinal axis of said upwardly directed passage means which passes through said lowermost portion of said settling chamber will be positioned angularly relative to a vertical plane extending longitudinally of said settling chamber, inlet means for aqueous medium to be treated in said gasification chamber, means for removal of clarified liquid from said settling chamber, flow passage means providing communication between the upper portion of said gasification chamber and the lower portion of said settling chamber, said settling chamber having the lower portions thereof shaped to direct concentrated solid material to said inlet of said upwardly directed passage flow means, fluid flow regulating means associated with at least one of the flow passage means whereby liquid is transferable between the gasification and settling chambers and gas dispersing means positioned below the normal liquid level in said gasification chamber.

2. The apparatus according to claim 1 wherein the upwardly directed flow passage means is a plurality of upwardly directed passages each running approximately parallel to said wall extending upwardly from the lowermost portion of said settling chamber and approximately parallel to each other.

3. The apparatus according to claim 1 wherein the gasification and settling chambers are separated by a wall member the upper portion of which is substantially vertically positioned and the lower portion of which extends parallel to said sloping wall extending upwardly from the lowermost portion of said settling chamber to said gasification chamber whereby a passage is provided between said lower portion of said divider and said sloping wall of said settling chamber.

4. The apparatus according to claim 1 which in addition includes means for wasting excess liquid suspension of sludge from said settling chamber.

5. The apparatus according to claim 1 wherein a baffle is spaced from said divider wall on the settling chamber side thereof and extends above the liquid level to be maintained in either the gasification or settling chambers and depends to a point further removed from the bottom of said settling chamber than said divider wall member to form a space between said divider wall and said baffle providing communication between the upper liquid portion of said aeration chamber and the lower portion of said settling chamber.

6. The apparatus according to claim 1 wherein there is an aperture means in said divider wall in a position below the normal liquid level in said gasification chamber and vertically movable plate means forming a liquid flow restricting means mounted on said wall member for cooperation with said aperture means.

7. The apparatus according to claim 1 wherein air dispersion means is associated with the outlet of said upwardly directed passage means.

8. Apparatus according to claim 1 in which the gasification and settling tanks have a common wall therebetween which has a vertical portion and an angularly positioned extension extending parallel to said upwardly directed wall and to a point adjacent the lowermost portion of said settling chamber and terminates in spaced relationship thereto, and said flow means providing communication between the upper portion of said gasification chamber and said settling chamber in an opening in said common wall and said upwardly directed passage outlet is formed between the upper edge of said wall extending from the lowermost portion of said settling chamber and the lowermost edge of the vertical portion of said common wall.

9. Apparatus according to claim 1 wherein baffle means is upstanding from the bottom of the gasification chamber adjacent to and extending above the outlet of said upwardly directed flow passage means and air dispersion means is positioned within the baffled area and below the level of the opening from the baffled area.

10. Apparatus for the treatment of an aqueous medium which during processing contains a flocculent material capable of settling by gravitation, said apparatus comprising closely adjacent gasification and settling chambers, inlet means in said gasification chamber through which said aqueous medium is introduced therein, outlet means in said settling chamber for the removal of clarified liquid therefrom, flow passage means interconnecting the upper portion of the gasification chamber with the lower portion of the settling chamber, conduit means interconnecting the bottom of said settling chamber and said gasification chamber and first aeration means disposed in said gasification chamber and adjacent to but below the flow path of the material flowing from said conduit means for providing a pumping action to return the material from said settling chamber to said gasification chamber without impeding the flow through said conduit means.

11. Apparatus as set forth in claim 10 in which said conduit means extends in an upward direction between said settling chamber and gasification chamber.

12. Apparatus as set forth in claim 10 including second aerating means in said gasification tank for treating the aqueous mediums disposed therein and a baffle disposed between said first and second aeration means, whereby said second aeration means does not disturb the flow through said conduit means.

13. Apparatus as set forth in claim 12 in which the gasification and settling chambers have a common vertical sidewall and the conduit means extends upwardly from the bottom of the settling tank into the gasification tank at a location substantially below the top of said baffle.

14. Apparatus for the treatment of an aqueous medium which during processing contains a flocculent material capable of settling by gravitation, said apparatus comprising closely adjacent gasification and settling chambers, inlet means in said gasification chamber through which said aqueous medium is introduced therein, outlet means in said settling chamber for the removal of clarified liquid therefrom, flow passage means interconnecting the upper portion of the gasification chamber and the lower portion of the settling chamber, upwardly directed conduit means interconnecting the bottom of said settling chamber and said gasification chamber, plate means in said settling chamber for inducing slow swirling movement of the aqueous medium to assist in the separation of the flocculent material out of said aqueous medium and movement thereof to said conduit means, and aeration means in said gasification chamber located adjacent to but below the flow path of the material flowing from said conduit means for providing a pumping action to induce flow out of said conduit from said settling chamber and thus recycle said material from said settling chamber to said gasification chamber.

15. Apparatus as set forth in claim 14 including second aerating means in said gasification tank for treating the aqueous medium disposed therein and a baffle disposed between said first and second aeration means, whereby said second aeration means does not disturb the flow through said second flow passage means.

16. Apparatus as claimed in claim 7, in which said air dispersion means has a controlled output of air, whereas the gas dispersing means having no substantial influence on the movement of the sludge in said passage has an output of air different from that of said air dispersion means, said air dispersion means and gas dispersing means communicating with a common conduit from a compressor, and means for limiting air flow is interposed between said compressor and said air dispersion means.

17. Apparatus as claimed in claim 12, in which said first aeration means has a controlled output of air, whereas the second aeration means which has no substantial influence on the movement of the sludge in said passage has an output of air different from that of said first aeration means, said first aeration means and second aeration means being in communication with a common conduit from a compressor, and means for limiting air flow are interposed between said compressor and said first aeration means.

References Cited

UNITED STATES PATENTS

| | | | |
|---|---|---|---|
| 3,028,011 | 4/1962 | McGivern | 210—220 |
| 3,168,465 | 2/1965 | Kraus et al. | 210—197 |
| 2,090,384 | 8/1937 | Durdin | 210—197 |

OTHER REFERENCES

Infilco, The Aero-Accelator, Bulletin 6510–D, 1957, Infilco Inc., Tucson, Ariz., 15 pp.

MICHAEL E. ROGERS, *Primary Examiner.*